United States Patent [19]

Honeycutt et al.

[11] 3,717,292
[45] Feb. 20, 1973

[54] DEGATING PLASTIC ARTICLES

[75] Inventors: Marshall Honeycutt, Fitchburg; William Pye, Leominster, both of Mass.

[73] Assignee: Amarin Plastics Inc., Leominster, Mass.

[22] Filed: March 24, 1971

[21] Appl. No.: 127,589

[52] U.S. Cl. .................................. 225/99, 225/102
[51] Int. Cl. ........................................... B26f 3/00
[58] Field of Search .......................... 225/99, 102, 93

[56] References Cited

UNITED STATES PATENTS 2,920,772  1/1960  Wilhelmetal .................. 225/99 X
3,182,875  5/1965  Fleining ............................ 225/99
3,098,593  7/1963  Heider ........................... 225/99 X

FOREIGN PATENTS OR APPLICATIONS 501,715  3/1939  Great Britain ....................... 225/99

*Primary Examiner*—Frank T. Yost
*Attorney*—Charles R. Fay

[57] ABSTRACT

Degating plastic articles from the runner therefor by placing the articles and runner as received from the mold in a shot between a pair of traveling belts which are guided along a path flexing the articles relative to the runner so as to break the articles from the runner. The runners and articles are then conveyed to separate locations.

10 Claims, 6 Drawing Figures

PATENTED FEB 20 1973
3,717,292
SHEET 1 OF 2
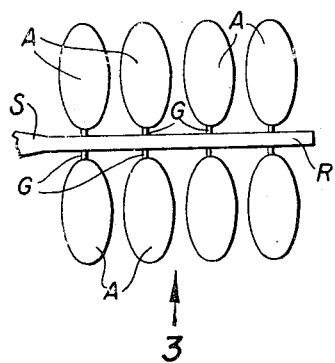
FIG. I
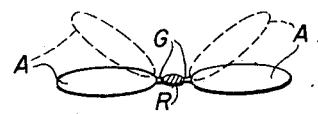
FIG. 2
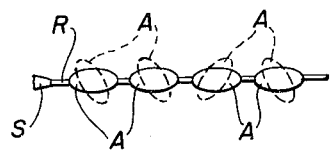
FIG. 3
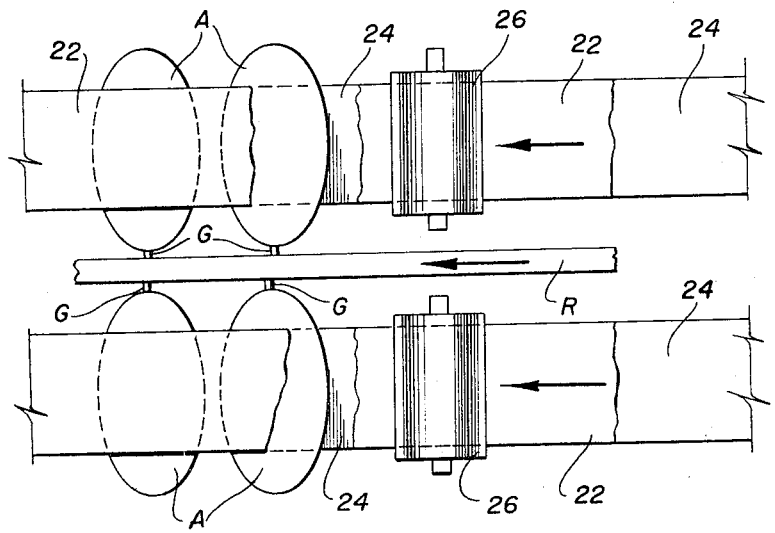
FIG. 5
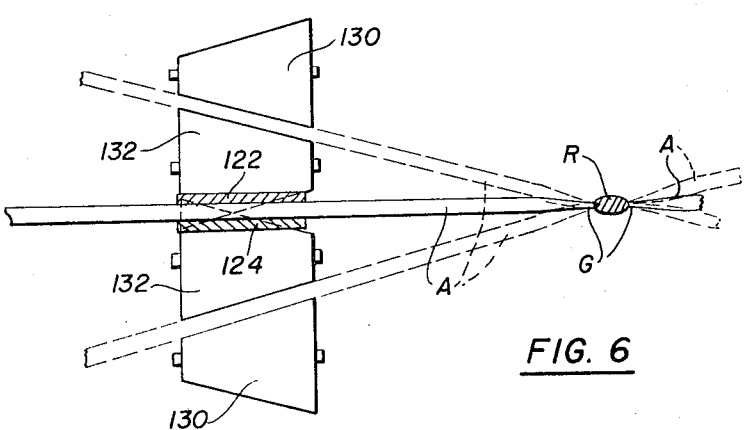
FIG. 6
Inventors
Marshall L. Honeycutt
et al.
Charles R. Fay
atty.

DEGATING PLASTIC ARTICLES

BACKGROUND OF THE INVENTION

Small plastic articles are normally molded in what is referred to as a shot including a runner with a plurality of articles extending laterally therefrom. The runner must be separated from the articles before use or packing. The break occurs at the gate which is a very small connection between the runner and article. In the past, operators usually stand near the molding machine, grasp the shots one at a time, and twist the articles from the runner, breaking the gates. This is expensive and cumbersome and often results in the necessity of running the molding machine at a speed less than its capacity.

The present invention provides an apparatus for easily and quickly removing the articles from the runner by flexing or pivoting the articles relative to the runner in an automatic machine.

SUMMARY OF THE INVENTION

The shots of the multiple plastic articles and connecting runners drop from the injection molding machine through a chute wherein the shots are positioned so the articles are received and held by a pair of moving endless belts gripping the articles as for instance intermediate their ends, the runner being free of the belts and riding on a guideway. The belts are guided to move in an undulating path thus causing the articles to twist on their axes relative to the runners, but the runners move substantially in a straight path. The movement of the articles relative to the runners, flexes the gates relative to the runners, breaking the gates and freeing the articles from the runners. The articles are then further conveyed to a receptacle and the runner to a different receptacle.

BRIEF DESCRIPTION OF THE DRAWINGS

FIG. 1 is a top plan view showing a part of a shot;

FIG. 2 is a view looking in the direction of arrow 2 in FIG. 1;

FIG. 3 is an edge view looking in the direction of arrow 3 in FIG. 1;

FIG. 5 is a plan view of a portion of said machine; and

FIG. 6 is a detail illustrating a slight modification.

PREFERRED EMBODIMENT OF THE INVENTION

Figure 4:
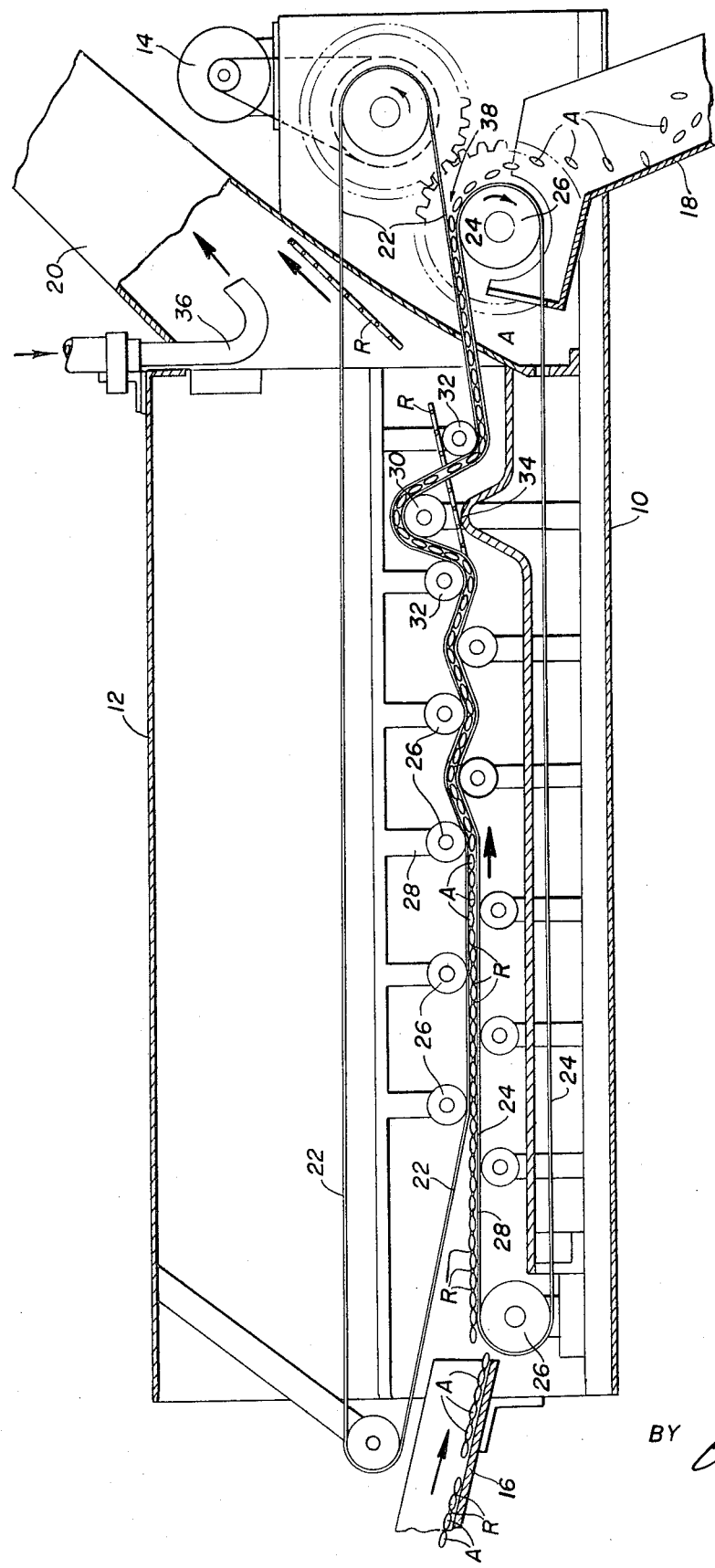
FIG. 4 is a view in side elevation of the novel machine for degating.

Referring to FIGS. 1-3 inclusive, a shot or portion thereof as it is ejected from the mold is shown. Articles A are connected by very small gates G to the runner R, the latter having the sprue S, broken or separated at the nozzle of the molding machine at the moment of ejection. Such shots are taken in hand by by-standing operators and the articles A manually twisted on axes transverse to the runner through the gates G, FIG. 3, or pivoted on axes parallel to the runner but also through the gates G, FIG. 2, to break the articles from the runners at the gates. A combined twisting and pivoting action is also used to separate the articles as quickly and easily as possible. Clearly the mold is to be operated only as fast as the operators can separate the articles ready for stacking or packaging.

FIG. 4 illustrates a degating machine of the present invention. This machine is provided with proper framework 10 including a base 12, motor 14, infeed chute 16 for the shots, exit chute 18 for the degated articles, and exit chute 20 for the runners. A pair of belts 22, 24 are driven by the motor and have rollers or pulleys as at 26 providing guides for superposed flatly contacting runs 28, 28 traveling together from inlet chute 16 to outlet chute 18. The shots drop from the mold onto chute 16 and proceed to the nip of the belts, being grasped thereby and fed forwardly.

As shown in FIG. 5, there are two pairs of belts separated as indicated. The articles at one side of the runner, see FIG. 1, are grasped in the nip of one pair of belts and the articles at the other side of the runner are similarly grasped in the nip of the other pair of belts. The runners are free of the belts as are the gates.

The rollers or pulleys in FIG. 4 are cylindrical and as they approach the chutes 18 and 20 they are in effect placed in gradually overlapping relation as respects the belts and the shots. Thus instead of moving the shots in co-planar relation, the belts start to cause the articles to rise and fall. The runners cannot rise and fall with the articles because they are held to the co-planar relation by succeeding articles, still co-planar. This action twists the articles relative to the runners, about axes transverse to the runners and passing through the gates.

Then, the shots arrive at roller or pulley 30 which is extremely offset from the general plane of the belt nip, the belts being trained as shown in FIG. 4 by holddowns 32, 32, and the runner is now completely free and forced upwardly at an angle by a lower abutment 34, heading for chute 20 which has an air jet at 36 to carry the severed runners out of the machine to a receptacle not shown. Meanwhile the articles A are still held by the two pairs of belts and moved to point 38, where the belts separate and allow the articles to fall into chute 18, to a collection receptacle, not shown.

The rollers or pulleys 30, 32 in FIG. 4 are cylindrical but in FIG. 6 they are conical and thus laterally incline the belts 122 and 124. The conical rollers or pulleys are indicated at 130 and 132, and these may be duplicated as shown. This has the effect of pivoting the articles on axes parallel to the runners and passing through the gates, as illustrated in FIG. 2, to degate the articles in this manner.

We claim:

1. Degating machine for a shot of articles, the shot including a runner and a plurality of articles extending laterally from the runner, the articles being connected to the runner by gates, comprising a pair of belts gripping the articles and advancing the shot, and means guiding the belts to move the articles in planes different from that of the advancing runner thereby moving the articles relative to the runner and flexing the gates to a degree disrupting the gates and thereby breaking the runner from the articles.

2. The degating device of claim 1 wherein the gripping means includes a second pair of endless belts gripping articles at both sides of the runner.

3. The degating device of claim 1 wherein the gripping means includes a second pair of endless belts gripping articles at both sides of the runner, the runner being free of the belts.

4. The degating apparatus of claim 1 wherein the gripping means includes a second pair of laterally endless belts, the spacing between the belts being sufficient to accommodate the runner, which is free of the belts, and including means supporting the runner as it advances with the articles.

5. The degating device of claim 1 wherein the belts cause the articles to twist on axes normal to the runner.

6. The degating device of claim 1 wherein the belts cause the articles to pivot at the gates on axes parallel to the runner.

7. Degating apparatus for breaking plastic articles in a shot from the runner comprising two pairs of endless belts, laterally spaced relative to each other, driving rolls for each pair of belts, a plurality of idler rolls for each pair of belts, an initial set of idler rolls located in a plane, a subsequent set of idler rolls positioned out of said plane to cause the belts to travel in different planes, guiding means for the articles to position the articles between the respective pairs of belts with the runner located between the pairs of belts, whereby the articles travel in a plurality of different planes while the runner is maintained substantially in a single plane, flexing the articles relative to the runner and breaking them off.

8. The degating device of claim 7 wherein the path of the belts is such as to result in twisting the articles.

9. The degating device of claim 7 wherein the path of the belts results in pivoting the articles.

10. The degating apparatus of claim 7 including conveying means for the broken off articles to one receptacle and different conveying means to convey the broken off runners to a separate receptacle.

* * * * *